Figure 1:
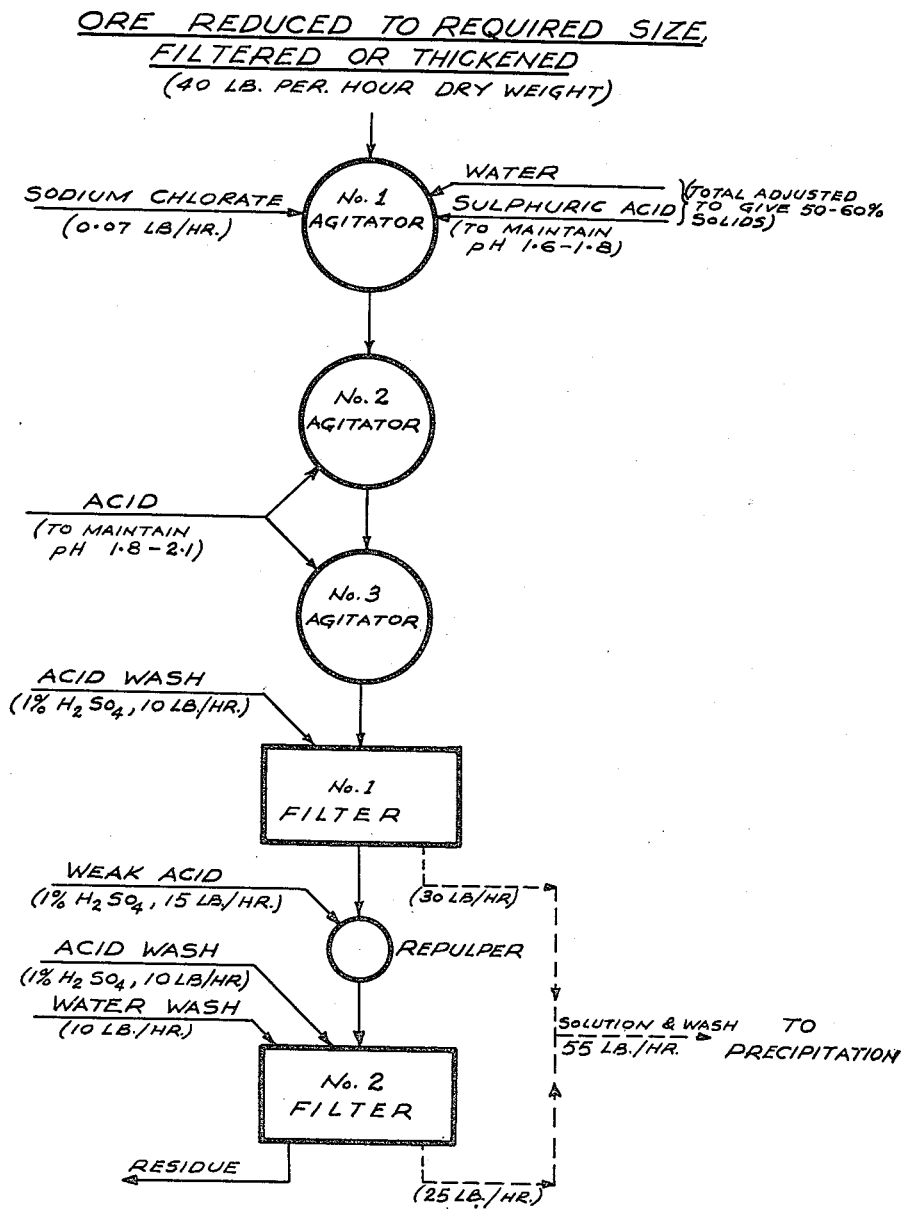

ARVID THUNAES
ERNEST ARTHUR BROWN
HAROLD WILLIAM SMITH
JOHN BRANNEN
    INVENTORS

United States Patent Office 2,738,253
Patented Mar. 13, 1956

2,738,253
URANIUM SEPARATION PROCESS

Arvid Thunaes, Ernest Arthur Brown, and Harold William Smith, Ottawa, Ontario, and John Brannen, Brittania Bay, Ottawa, Ontario, Canada, assignors to Eldorado Mining and Refining Limited, Ottawa, Ontario, Canada, a corporation of Canada Continuation of application Serial No. 224,063, May 1, 1951. This application August 10, 1953, Serial No. 373,387

Claims priority, application Canada November 22, 1949

6 Claims. (Cl. 23—14.5)

This process relates to the separation of uranium from its ores and more particularly to an acid leaching process for dissolving uranium from its ores.

This is a continuation of application 224,063, filed May 1, 1951, now abandoned.

Previously, acid leaching of pitchblende and other uranium bearing ores has been confined largely to treatment of high-grade products such as gravity concentrates or picked ore. In these processes hot concentrated acid solutions play an important part and roasting of the feed is often a preliminary step. Nitric acid or a nitrate is usually used as an oxidizing agent. The use of concentrated acid solutions and the relatively high concentration of oxidizing agent if nitric acid or a nitrate is employed would be uneconomical in the treatment of low-grade and complex ores. The use of ferric sulphate as an oxidizing agent had previously been considered but the use of this reagent has certain disadvantages, as will appear subsequently.

The object of the present process is to provide a method for the economical extraction of uranium which may be used not only for the treatment of high-grade products but for low-grade ores and complex ores which contain, for example, cobalt, nickel, copper, iron, manganese, bismuth, lead, arsenic, sulphur, phosphorous and carbonate minerals.

In general the present process comprises conversion of such of the uranium as is present in the tetravalent state to the hexavalent state by means of a strong oxidizing agent and the dissolution of uranium in the hexavalent state by weak solutions of sulphonic acid. This process is carried out at a low pH and maintaining an oxidizing condition to keep uranium in solution in the presence of arsenate and phosphate. Copending application Serial No. 224,062, filed May 1, 1951, describes a method for the recovery of uranium from the dilute suphuric acid leach solutions thus produced.

Figure 1 illustrates diagrammatically the basic leaching flowsheet.

The ore is first suitably ground, the degrees of fineness depending upon the grain size at which substantially all the uranium minerals are liberated, that is, made accessible to attack by the leach solutions. The majority of pitchblende ores should be ground to minus 40 mesh.

With some types of ore additional treatment of the leach feed will be advantageous such as, for example, the removal of certain constituents of the ore by froth flotation. Arsenides and sulphides may be separated as a flotation concentrate for subsequent separate leaching since a considerable proportion of the uranium may be intimately associated with sulphides and arsenides which generally require a greater concentration of oxidizing agent. Carbonate minerals may be partly removed by flotation in order to reduce acid consumption. The amount of such carbonate minerals which should be removed will depend upon economic factors and on the loss of $U_3O_8$ in the carbonate froth product.

The ore pulp is fed into an agitator designated on the flowsheet as No. 1 agitator. Sodium chlorate, sulphuric acid and, if required, water are added in this agitator. Sodium chlorate has been found to be the most suitable oxidizing agent for this process although other strong oxidizing agents may be used. An oxidizing agent is used because cold dilute sulphuric acid alone will not dissolve $UO_2$ at a useful rate but will do so quite readily if an oxidizing agent is present. An additional reason for using an oxidizing agent is that the uranium which has been dissolved in the leach solution should be kept in the hexavalent (uranyl) form. If the uranium is allowed to become reduced to the tetravalent (uranous) form by reducing agents introduced with or leached from the ore, it may be precipitated by impurities in the solution such as phosphate or arsenate, even at pH values well below 2. Hexavalent uranium also is precipitated by these ions but at higher pH values, thus the uranium may be kept in solution by control of the pH.

Sodium chlorate is particularly suitable as an oxidizing agent since it will maintain in substantially a completely oxidized condition, elements such as uranium and iron. All known uranium ores contain some iron mineral soluble in weak sulphuric acid. Sodium chlorate, being one of the most powerful oxidizing agents known, will oxidize substantially all ferrous irons to ferric and the elimination of ferrous iron will drive the following reaction to the right.

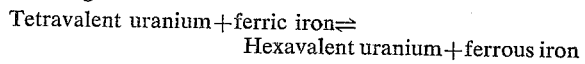
Tetravalent uranium+ferric iron⇌Hexavalent uranium+ferrous iron

The reaction of the chlorate ion itself, to oxidize other ions and form chloride ions, is not reversible in leach solutions. In addition, ores ground by steel equipment will generally contain significant amounts of metallic iron. In the presence of an active reducing agent such as this, hexavalent uranium will be reduced to tetravalent uranium which can be precipitated by arsenates or phosphates even at pH values as low as 1.3. If a less effective oxidizing agent such as ferric sulphate be used this metallic iron will be oxidized only as far as the ferrous condition and the considerations previously set forth will apply. Sodium chlorate, on the other hand, is sufficiently powerful as an oxidizing agent to take the metallic iron to the ferric form.

Another advantage in using sodium chlorate is the small weight of reagent required. It may be calculated from the following equations that 1 part of sodium chlorate by weight as oxidizing agent is equivalent to 2.45 parts by weight of $MnO_2$ or 11.26 parts by weight of $Fe_2(SO_4)_3$ in oxidizing the same amount of uranium from the tetravalent to the hexavalent form.

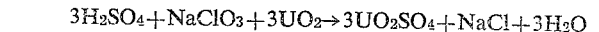
$$3H_2SO_4+NaClO_3+3UO_2\rightarrow 3UO_2SO_4+NaCl+3H_2O$$
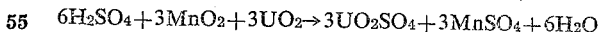
$$6H_2SO_4+3MnO_2+3UO_2\rightarrow 3UO_2SO_4+3MnSO_4+6H_2O$$
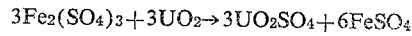
$$3Fe_2(SO_4)_3+3UO_2\rightarrow 3UO_2SO_4+6FeSO_4$$

It will also be clear from examination of these equations that the oxidation reaction with sodium chlorate requires only one half of the acid consumed in the oxidation reaction using manganese dioxide. The oxidation reaction in which ferric sulphate is used as oxidizing agent consumes no acid, but the amount of ferric sulphate required more than offsets the acid consumed by the sodium chlorate reaction. If manganese dioxide or ferric sulphate is used in place of sodium chlorate as oxidizing agent the quantity of oxidizing agent required may be further increased since ferric and manganic ions will precipitate with phosphate and arsenate ions at pH values as low as 1.2. The oxidizing ion $ClO_3$ provided by sodium chlorate is not precipitated by phosphate and arsenate at low pH values. In view of the weight advantage, it is cheaper to use sodium chlorate than either ferric sulphate or manganese dioxide at the reagent prices and transportation costs prevailing at the date of this application and as has been seen sodium chlorate is more effective.

The amount of sodium chlorate which should be added to No. 1 agitator varies with the particular ore being treated but a typical quantity is shown in the flowsheet illustrated in Figure 1 in which the ratio between ore and sodium chlorate is 40 lb./hr. dry weight to 0.07 lb./hr. The amount of sodium chlorate added should be sufficient to leave a slight excess at the end of agitation and maintain substantially all dissolved iron in the ferric state. The sulphuric acid is also added to agitator No. 1 in quantities sufficient to maintain the pH at below 2 and preferably between 1.6 and 1.8. The sulphuric acid dissolves hexavalent uranium and acts with the oxidizing agent to dissolve tetravalent uranium. Low pH values are maintained at this stage and throughout the process to prevent the precipitation of uranium by impurities in the solution, particularly phosphates and arsenates.

Instead of sodium chlorate, other strong oxidizing agents such as potassium chlorate, chloric acid or sodium persulphate may be used.

The tolerance of uranyl sulphate solution for arsenate is shown by Experiment 1 which illustrates and justifies the importance of conducting the process at a low pH.

EXPERIMENT 1

To samples of uranyl sulphate solution containing the equivalent of 1.25 grams $U_3O_8$ per litre was added sulphuric acid to bring the pH to the initial values shown below. Sodium arsenate solution containing 18.9 grams of arsenic per litre was added until a noticeable precipitate formed and the pH at which this occurred was noted. The amount of arsenic added is expressed in equivalents, an equivalent being the amount required to form $UO_2HAsO_4$ with the uranium in the sample.

| pH of uranium solution | | Arsenic added to precipitation point, equivalents |
|---|---|---|
| Initial | At precipitation point | |
| 1.0 | 2.1 | 25.8 |
| 1.5 | 2.0 | 4.5 |
| 2.0 | 2.15 | 0.45 |

In Experiment 2 the importance of low pH in the presence of phosphates is illustrated by showing the tolerance of uranyl sulphate solution for phosphate.

EXPERIMENT 2

To samples of uranyl sulphate solution of pH 0.9, 1 litre=1 gram $U_3O_8$, was added phosphoric acid solution of pH 1.7, 1 litre=2.53 grams $P_2O_5$. Sodium hydroxide was added where necessary to adjust the pH to the values given below. The amount of $P_2O_5$ added is expressed in equivalents, an equivalent being the amount stoichiometrically required for formation of $UO_2HPO_4$ with the uranium in the sample.

| pH | Equivalents of $P_2O_5$ added | Precipitation |
|---|---|---|
| 1.25 | 37.5 | none. |
| 1.7 | 1.5 | none in 24 hours. |
| 1.8 | 1.5 | Do. |
| 1.9 | 1.5 | after 2 hours. |
| 1.9 diluted to 2X | 1.5 | none in 5 hours. |
| 2.0 | 3 | immediate. |
| 2.0 | 1.5 | after 2 hours. |
| 2.0 | 1 | none in 7 hours. |
| 2.1 | 2 | immediate. |
| 2.1 | 1.5 | Do. |

It will be evident from the foregoing that the addition of acid must be regulated to maintain a pH value in the pulp of 1.5–2.0 and preferably 1.6 to 1.8 where the ore contains arsenic or phosphorous. The pH may be higher if these elements are absent. The lower pH limit inserted above of 1.5 is not as critical as the upper limit but rather marks the point at which it is no longer necessary or economical further to reduce the pH by increasing the concentration of sulphuric acid. It will also be clear, from the experimental results given above, that slight variations in the upper pH limit will occur in different ores; thus if the ore contains only small quantities of arsenates and phosphates an upper limit of 2.0 may be used, if the ore contains a greater proportion of these impurities the pH must not be allowed to rise above 1.8.

The sulphuric acid is added cold and diluted to agitator No. 1 in sufficient quantities to maintain the desired pH. Any convenient strength of sulphuric acid can be used providing the concentration is suitable for pH control at the operating pulp density. Water may also be added to agitator No. 1 to adjust the liquid:solids ratio. Adjustment of the total to 50–60% solids has given good results.

The pulp density may be varied but a ratio of about 3 liquid to 4 solids may be readily handled by subsequent filtering without preliminary thickening; also the resulting leach solution contains a greater concentration of uranium when a minimum of liquid is used per unit of solids. The ore pulp may, if necessary, be filtered before being fed into No. 1 agitator to increase the pulp density.

A moderate amount of agitation is sufficient, such as may be obtained by the agitators commonly used in the cyanidation process but using only a minimum of rake speed and air. The total time of agitation will depend on the ore and is determined by the point at which the value of the uranium extracted per unit time becomes less than the cost of treatment: for one type of ore the total agitation time thus selected was 24 hours. That is to say, 24 hours elapsed from the time ore was added to agitator No. 1 to the time the pulp was discharged from agitator No. 3.

Temperature of the pulp may be varied but it is preferable to use a low temperature of 10–15° C. since the dissolution of uranium minerals is not appreciably retarded by low temperatures and the acid consumption by gangue minerals generally decreases with decreasing pulp temperatures to an extent which offsets such retardation of the dissolution of uranium minerals as occurs.

The flowsheet shows three agitators in series. Reagents as described above are added continuously to agitator No. 1. Agitator No. 3 discharges to No. 1 filter. For a continuous process a minimum of three agitators in series should be used to reduce short circuiting.

Additional acid is added to agitators Nos. 2 and 3 to maintain the pH between 1.8–2.1. Where the pH is allowed to rise as high as 2.1 in agitators Nos. 2 and 3, there will be appreciable reprecipitation of hexavalent uranium as arsenate and phosphate if the ore contains these impurities. A repulping step will therefore be necessary to dissolve this precipitate if a relatively high pH is used. If it is desired to omit the repulping step the pH should be maintained at 1.6–1.8 in agitators Nos. 2 and 3.

The pulp leaving agitator No. 3 is discharged into a filter for separation of the uranium bearing liquor. The filter cake is washed with weak acid solution and finally with water. Double filtration is preferable for ores which contain soluble arsenic and phosphates. Between the first and second filter a repulping step is introduced in which the cake from the first filter is repulped with 1 to 2% sulphuric acid which may contain a small amount of sodium chlorate. The addition of sodium chlorate in the repulping step may be omitted if a slight excess of sodium chlorate has been added to agitator No. 1 since there will then be some residual sodium chlorate in the leach liquor. Although dissolution of precipitates of hexavalent uranium as arsenate and phosphate will occur in the repulping step, in view of the residual sodium chlorate in the leach liquor the repulping step would not have to redissolve any precipitate of tetravalent uranium. The time of contact during repulping may be 5–10 minutes and it will be observed that a substantial saving of acid is achieved compared with a process in which a sufficiently low pH value is maintained during the whole of the agitation period to prevent reprecipitation of the uranium. Repulping is particularly advantageous where the ore contains minerals slightly soluble in acid such as, for example, carbonates. Another advantage of repulping is that less reagent is required for a reduction process such as is described in copending application Serial No. 224,062 if the pH is comparatively high.

After repulping, the pulp is passed to the second filter where it is washed with 1% sulphuric acid followed by water. The amount of wash acid is determined by tests with a particular ore, acid consumption and the cost of treating additional solution being balanced against increased uranium recovery. A typical quantity of 10 lb./hr. of acid wash to 40 lb./hr. dry weight of ore is shown in the flowsheet.

The residue from No. 2 filter is discharged as waste. The filtrates and wash solution from No. 1 and No. 2 filters are combined in the case of complex ores and are given further treatment such as is described in copending patent application Serial No. 224,062 to extract uranium from the leach solution. If the ore does not contain significant amounts of detrimental impurities it may, as an alternative to combining the filtrates, be advantageous to recirculate the wash solution from filters 1 and 2 and the leach solution from filter 2 or one or more of these solutions may be recirculated to the first agitator to build up the uranium content of the solution which passes to the precipitation process and to reduce acid consumption.

Example 1 which follows gives the results of a laboratory test carried out in accordance with the process described in this application.

*Example 1*

ASSAY OF ORE TREATED

| | Percent |
|---|---|
| $U_3O_8$ | 0.305 |
| $CO_2$ | 3.36 |
| Fe | 3.38 |
| As | 0.35 |
| $P_2O_5$ | 1.15 |

SIZE ANALYSIS

| Mesh: | Weight percent |
|---|---|
| 100 | 9.45 |
| −100+150 | 11.65 |
| −150+200 | 14.10 |
| −200+325 | 14.80 |
| −325 mesh | 32.40 |
| −325 slimes | 17.60 |

500 grams of ore (dry weight) were leached for 24 hours at a temperature of 20° C. and at a dilution of 4 grams ore to 3 ccs. solution. Sodium chlorate, 5 lbs. per ton ore was added at the beginning of the leach agitation.

For the first seven hours of agitation the pulp was controlled at pH 1.5 by adding sulphuric acid when required. In the remaining 17 hours of the leach time no more sulphuric acid was added and the pH has risen to a final value of 2.1 at the end of the 24 hour agitation period.

The pulp was then filtered and the filter cake was given a replacement wash with 125 cc. of 1% sulphuric acid (i. e. 500 lbs. 1% acid solution per ton ore).

The filter cake was then repulped by agitation with 185 cc. of water (740 lbs. water per ton ore) to which sulphuric acid was added to bring the pH of the pulp to 1.20 (4 lbs. 100% $H_2SO_4$ per ton ore). The contact time in repulping was approximately 4 minutes. The pulp was filtered and the filter cake washed once with 125 cc. of 1% sulphuric acid (500 lbs. 1% acid per ton ore) followed by a final wash with 125 cc. water (500 lbs. per ton ore). The first acid wash filtrate (the wash preceding the repulping step) was combined with the original leach liquor, since it was a replacement wash and the solution it displaced from the filter cake would be that portion of the leach liquor retained as moisture by the cake formed in filtering the original leach pulp.

The filtrates, from the repulping and subsequent washing steps were combined but kept separate from the filtrates above for the purposes of this test to enable the proportion of uranium recovered by the repulping step to be ascertained. No oxidizing agent was added in the repulping step.

The test was conducted at 20° C. Table 1 shows that the extraction of uranium was 88.7%, nearly a third of which was recovered through the repulping step in view of the high pH of 2.1 at the end of agitation.

*Table 1*

| | Wt., gms. | Vol., ccs. | Fe, Grams | As, Grams | $P_2O_5$, Grams | $U_3O_8$, Grams |
|---|---|---|---|---|---|---|
| Ore treated | 500 | | 16.90 | 1.75 | 5.75 | 1.525 |
| Filtrate from leach and first wash | | 335 | 0.767 | 0.228 | 0.067 | 0.925 |
| Filtrate from repulping step and final washes | | 445 | 0.445 | 0.227 | 0.062 | 0.427 |
| Total in filtrates | | | 1.212 | 0.455 | 0.129 | 1.352 |
| Residue | 480 | | 15.69 | 1.30 | 5.62 | 0.173 |
| Percent of total in combined filtrates | | | 7.2 | 26.0 | 2.2 | 88.7 |

It will be appreciated from the foregoing that the process which has been described constitutes a highly economical and practical method for the treatment not only of high-grade uranium ores but of low-grade and complex ores.

We claim:

1. A process for dissolving uranium from ores containing ferrous iron minerals and tetravalent uranium in which uranium is brought into solution by agitating the ore with cold dilute sulphuric acid sufficient to maintain a highly acid reaction condition of a pH of less than 2.1 in the presence of sodium chlorate in an amount sufficient to oxidize substantially all ferrous iron to ferric and to convert substantially all tetravalent uranium to hexavalent uranium, and to maintain the uranium in a hexavalent condition.

2. A process for dissolving uranium from ores containing ferrous iron minerals, metallic iron and tetravalent uranium in which uranium is brought into solution by agitating the ore with cold dilute sulphuric acid sufficient to maintain a highly acid reaction condition of a pH of 1.5 to 2.1 in the presence of sodium chlorate in an amount sufficient to oxidize substantially all ferrous iron to ferric and substantially all metallic iron to ferric iron and to convert substantially all tetravalent uranium to hexavalent uranium and to maintain the uranium in a hexavalent condition.

3. A process for dissolving uranium from complex ores containing ferrous iron and elements such as arsenic and phosphorous and in which uranium occurs in the tetravalent form in which uranium is brought into solution by cold dilute sulphuric acid sufficient to maintain a pH of slightly less than 1.8 in the presence of sodium chlorate in an amount sufficient to oxidize substantially all ferrous iron to ferric and to convert substantially all tetravalent uranium to hexavalent uranium and to maintain the uranium in a hexavalent condition.

4. A process for dissolving uranium from complex ores containing ferrous iron and elements such as arsenic and phosphorous and in which uranium occurs in the tetravalent form in which uranium is brought into solution by agitation with cold dilute sulphuric acid sufficient for a pH of slightly less than 1.8 at the commencement of agitation and a pH of less than 2.1 at the termination of the agitation period in the presence of an oxidizing agent containing the chlorate radical sufficient to oxidize substantially all ferrous iron to ferric and to convert substantially all tetravalent uranium to hexavalent uranium and to maintain the uranium in a hexavalent condition and in which the ore is subsequently filtered and repulped with additional cold dilute sulphuric acid and then refiltered.

5. A process as described in claim 4 in which sodium chlorate is used as the oxidizing agent.

6. A process for dissolving uranium from ores containing ferrous iron and tetravalent uranium in which uranium is brought into solution as uranyl sulphate by agitation with cold dilute sulphuric acid sufficient for a pH of slightly less than 1.8 at the commencement of agitation and a pH of less than 2.1 at the termination of the agitation period in the presence of sodium chlorate in an amount sufficient to oxidize substantially all ferrous iron to ferric and to convert substantially all tetravalent uranium to hexavalent uranium and to maintain the uranium in a hexavalent condition and in which the ore is subsequently filtered and repulped with additional cold dilute sulphuric acid and additional oxidizing agent and then refiltered.

References Cited in the file of this patent

UNITED STATES PATENTS

| | | |
|---|---|---|
| 1,437,191 | Paul | Nov. 28, 1922 |
| 1,471,514 | Elliot | Oct. 23, 1923 |
| 2,176,610 | Stamberg | Oct. 17, 1939 |
| 2,199,696 | Fleck | May 7, 1940 |

OTHER REFERENCES

MacTaggart: The Industrial Chemist, vol. 18, pages 421–426 (Nov. 1942).